(12) United States Patent
Yoon et al.

(10) Patent No.: US 10,625,667 B2
(45) Date of Patent: Apr. 21, 2020

(54) EXTERNAL VEHICLE NOTIFICATION INFORMATION SYSTEM AND VEHICLE HAVING THE SAME

(71) Applicants: Hyundai Motor Company, Seoul (KR); Kia Motors Corporation, Seoul (KR)

(72) Inventors: Jin-Young Yoon, Gyeonggi-do (KR); Kyu-Nam Jeon, Gyeonggi-do (KR); Dong-Ho Kwon, Gyeongsangbuk-do (KR); Jong-Min Park, Seoul (KR); Jung-Wook Lim, Seoul (KR); Moon-Seop Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/156,035

(22) Filed: Oct. 10, 2018

(65) Prior Publication Data

US 2019/0176688 A1 Jun. 13, 2019

(30) Foreign Application Priority Data

Dec. 8, 2017 (KR) .......................... 10-2017-0168538

(51) Int. Cl.
*B60Q 1/26* (2006.01)
*B60Q 1/50* (2006.01)
*B60K 35/00* (2006.01)
*B60Q 1/56* (2006.01)
*B60R 13/10* (2006.01)

(52) U.S. Cl.
CPC .............. *B60Q 1/503* (2013.01); *B60K 35/00* (2013.01); *B60Q 1/2661* (2013.01); *B60Q 1/56* (2013.01); *B60K 2370/1523* (2019.05); *B60K 2370/161* (2019.05); *B60K 2370/178* (2019.05); *B60K 2370/23* (2019.05); *B60K 2370/334* (2019.05); *B60K 2370/66* (2019.05); *B60K 2370/797* (2019.05); *B60R 13/105* (2013.01)

(58) Field of Classification Search
CPC . B60Q 1/26; B60Q 1/50; B60Q 1/503; G02B 27/01; G02B 27/0101; G01C 21/365
See application file for complete search history.

(56) References Cited

U.S. PATENT DOCUMENTS

| | | | | |
|---|---|---|---|---|
| 2003/0128182 | A1* | 7/2003 | Donath | B60R 1/00 345/156 |
| 2005/0154505 | A1* | 7/2005 | Nakamura | G01C 21/365 701/1 |
| 2006/0071877 | A1* | 4/2006 | Kanamori | G02B 17/023 345/7 |

(Continued)

FOREIGN PATENT DOCUMENTS

KR 20130075817 A 7/2013

*Primary Examiner* — Andrew W Bee
(74) *Attorney, Agent, or Firm* — Mintz Levin Cohn Ferris Glovsky and Popeo, P.C.; Peter F. Corless

(57) ABSTRACT

An external vehicle notification information system may include a projector illuminating generated information using a light source, a lens transmitting the information, a reflector reflecting partial information of the information toward the lens, and a screen displaying the partial information transmitted from the lens.

8 Claims, 5 Drawing Sheets

(56) References Cited

U.S. PATENT DOCUMENTS

2015/0002543 A1* 1/2015 Ting .................. G02B 27/01
                                              345/633
2015/0108782 A1* 4/2015 Chou ................ G02B 27/0101
                                              296/90
2016/0288644 A1* 10/2016 Bochenek .............. B60K 35/00

* cited by examiner

EXTERNAL VEHICLE NOTIFICATION INFORMATION SYSTEM AND VEHICLE HAVING THE SAME

CROSS-REFERENCE TO RELATED APPLICATION(S)

This application claims under 35 U.S.C. § 119(a) the benefit of Korean Patent Application No. 10-2017-0168538 filed on Dec. 8, 2017, the entire contents of which are incorporated by reference herein.

BACKGROUND

(a) Technical Field

The present disclosure relates to an external vehicle notification information system, and more particularly, to a vehicle capable of definitely notifying a driver of another vehicle (e.g., a rear vehicle) of vehicle-related information by the external vehicle notification information system.

(b) Description of Related Art

A vehicle may be provided with an external display capable of notifying the driving state of the vehicle to drivers of nearby vehicles (e.g., vehicles to the front/rear and left/right) in order to achieve safe driving.

Examples of the external display are a turn signal guide and a backward guide. As an example, the turn signal guide notifies the outside of the left/right turning directions or the lane change intent of the vehicle in a flashing manner. The backward guide notifies the outside of the backward intent of the vehicle in a lighting manner.

Accordingly, the turn signal guide and the backward guide are used as the external display notifying drivers of nearby vehicles (particularly, a driver of a rear vehicle) of driving state and information of the vehicle, thus contributing to safe driving operation.

However, the turn signal guide and the backward guide have the following limitations in terms of efficiency of external notification display for vehicle information.

The first one is lack of visibility, and this is because the turn signal guide and the backward guide are difficult to operate in the outside during the daytime by using the lighting of the bulb. The second one is the limitation of external notification information, and this is because the turn signal guide and the backward guide each have only a single use. The third one is the limitation of the implementation of various commerciality, and this is because one-type technology, such as the turn signal guide and the backward guide, cannot provide additional external notification information.

Accordingly, an object of the present disclosure is to provide an external vehicle notification information system and a vehicle having the same capable of displaying the driving state and information of the vehicle to the outside to notify drivers of nearby vehicles, thus implementing safe driving, and particularly, representing external display information by projection video technology, thus implementing superior marketability by diversification of the external display information while maintaining high visibility to nearby vehicles regardless of day-and-night.

The contents described in Description of Related Art are to help the understanding of the background of the present disclosure, and may include what is not previously known to those skilled in the art to which the present disclosure pertains.

SUMMARY

An external vehicle notification information system in accordance with the present disclosure is characterized by including a projector divided into phrases and figures and illuminating generated information using a light source; a lens transmitting the information; a reflector reflecting partial information of the information to the lens; and a screen displaying the partial information transmitted from the lens.

As a preferred embodiment, the projector divides the information into rear information, number information, and driving information. The number information and the driving information are reflected from the reflector as the partial information.

As a preferred embodiment, the projector includes a rear guide information projector illuminating the rear information, a driving information projector illuminating the driving information, and a number information projector illuminating the number information. The rear guide information projector and the driving information projector are configured to display a plurality of projections, respectively.

As a preferred embodiment, the reflector is inclined with respect to the lens in order to reflect the partial information to the lens, while the lens is in a horizontal state.

As a preferred embodiment, the screen displays the partial information in upper and lower portions.

As a preferred embodiment, the projector performs generation of the information and the illumination by a projection controller. The projection controller includes a voice recognition module for voice recognition, a multimedia module for interlocking with a mobile device, and an expansion module for interlocking with a vehicle system.

And, a vehicle in accordance with the present disclosure for achieving the object is characterized by including an external vehicle notification information system generating rear information, number information, and driving information as information for a rear vehicle to be displayed; and a trunk installed with the external vehicle notification information system.

As a preferred embodiment, the rear information indicates backward and caution warning display, the number information indicates a vehicle registration number, and the driving information indicates driver intent display.

As a preferred embodiment, a screen is attached to a license plate mounting portion of the trunk to display the number information and the driving information of the information.

As a preferred embodiment, the external vehicle notification information system uses a license lamp illuminating light toward the license plate mounting portion of the trunk as a source of a light source.

As a preferred embodiment, the external vehicle notification information system further includes a projection controller provided with a voice recognition module, a multimedia module, and an expansion module. The voice recognition module is interlocked with a vehicle voice recognition system, the expansion module is interlocked with a vehicle system, and the multimedia module is interlocked with a smart phone.

The vehicle in accordance with the present disclosure includes the external vehicle notification information system to implement the following functions and effects.

First, since the driving and state information of the vehicle are delivered to the drivers of the nearby and rear vehicles regardless of whether it's daytime or nighttime, stable driving can be enhanced. Second, a safe and pleasant driving experience can be implemented by diversification of the external display information using the projection video technology, thus greatly enhancing the commerciality thereof. Third, various external display information is linked with a license plate of the rear vehicle to obtain superior visibility of the rear driver while satisfying governmental regulations that require illuminating the license plate. Fourth, it is possible to perform the rear guide function by representing the display functions in various manners, such as a voice command and 'Backward'/'Brake'/'Get on/off' display, by the projector interlocking using vehicle voice recognition, rear gear and brake, and luminance sensor. Fifth, it is possible to obtain superior expansibility of an external multimedia, such as change of display phrases, by interlocking with a smart phone.

DESCRIPTION OF SPECIFIC EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure are described with reference to the accompanying drawings, and since the exemplary embodiments can be implemented in various different forms by way of example by those skilled in the art, so are not limited to the exemplary embodiments described herein.

Figure 1:
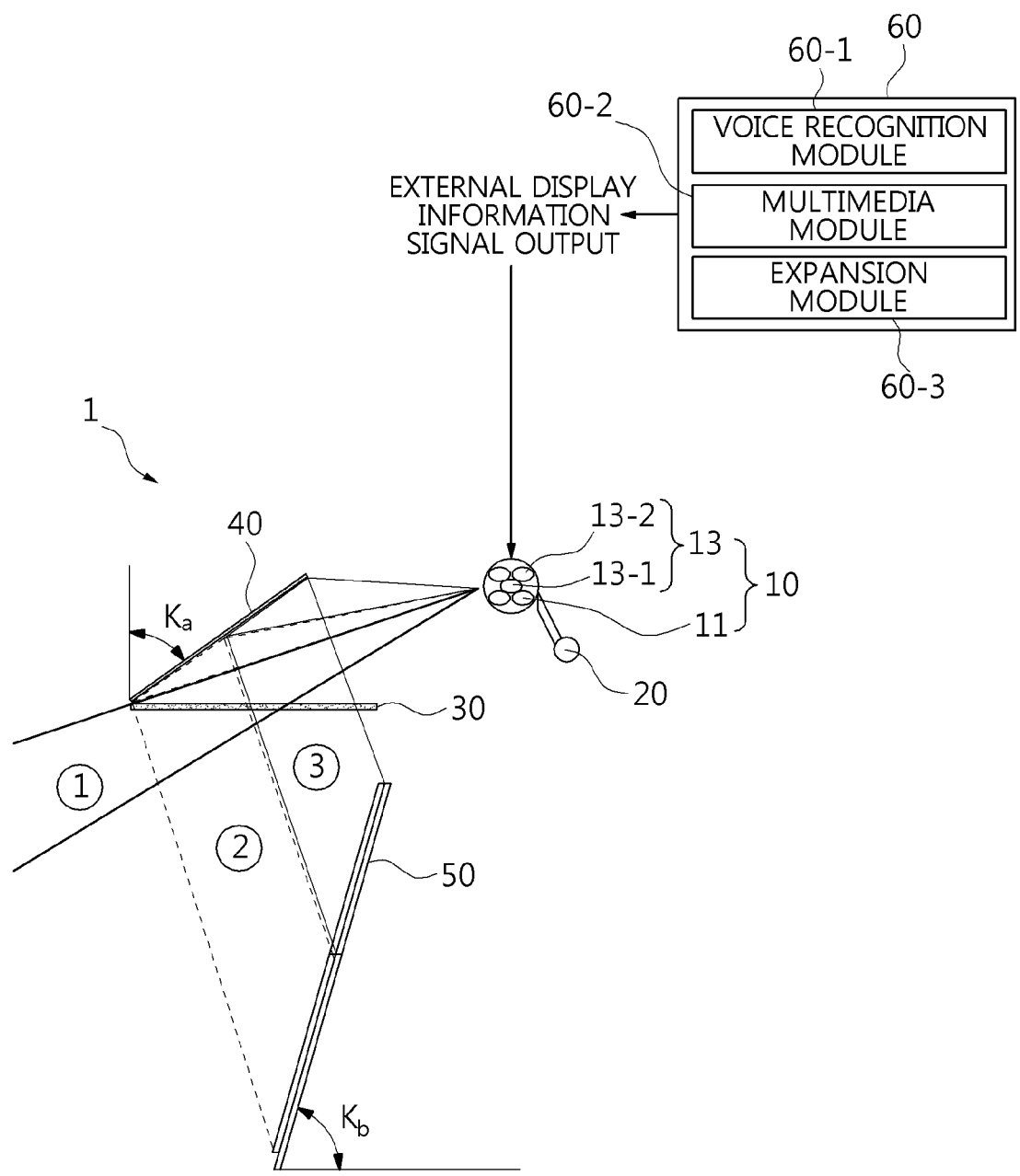
FIG. 1 is a configuration view of an external vehicle notification information system in accordance with the present disclosure.

Referring to FIG. 1, an external vehicle notification information system 1 includes a projector 10, a light source 20, a lens 30, a reflector 40, a screen 50, and a projection controller 60.

Specifically, the projector 10 generates external vehicle notification information, and receives the light source 20 to illuminate the generated external vehicle notification information to the outside. The external vehicle notification information indicates rear information 200 of backward and caution warning (e.g., phrases, safety distance, tripod display) and number information 300 of a vehicle registration number (referring to FIG. 4), and driving information 400 of driver intent display (e.g., text messages such as fault, braking, and yield)(referring to FIG. 5). For this purpose, the projector 10 preferably is a small size Digital Light Processing (DLP) projection type projector, and the entire space thereof is divided into a three-stage region using a vehicle information projector 13 composed of a driving information projector 13-1 and a number information projector 13-2 together with a rear guide information projector 11.

Specifically, the light source 20 generates light for information illumination of the projector 10, and is composed of the source of the light source. The lens 30 is arranged in a horizontal state downwardly from the illumination direction of the projector 10, and divides and passes through the information illuminated from the projector 10 into a guide information projector 11, a driving information projector 13-1, and a number information projector 13-2. The reflector 40 is placed above the lens 30 while facing the projector 10 in an inclined state at an acute angle of an installation angle (Ka) in the illumination direction of the projector 10, and reflects the light emitted from the projector 10 toward the lens 30. In this case, the installation angle (Ka) of the reflector 40 can be appropriately changed depending upon the arrangement of the lens 30 and the information display direction of the projector 10.

Specifically, the screen 50 displays the information of the projector 10 passing through the lens 30. Particularly, the screen 50 displays the information of the driving information projector 13-1 in an upward direction and the information of the number information projector 13-2 in a downward direction, considering the characteristic that the information of the rear guide information projector 11 deviates from the screen 50. In this case, the installation angle (Ka) of the screen 50 forms an acute angle with respect to the horizontal line thereof, but can be appropriately changed depending upon the arrangements of the lens 30 and the reflector 40.

Specifically, the projection controller 60 includes a voice recognition module 60-1, a multimedia module 60-2, and an expansion module 60-3. As an example, the voice recognition module 60-1 has the function of displaying by a recognition command. The multimedia module 60-2 has the function of displaying in interlocking with a smart phone. The expansion module 60-3 has the function of displaying in interlocking with other systems (e.g., a vehicle system).

Figure 2:
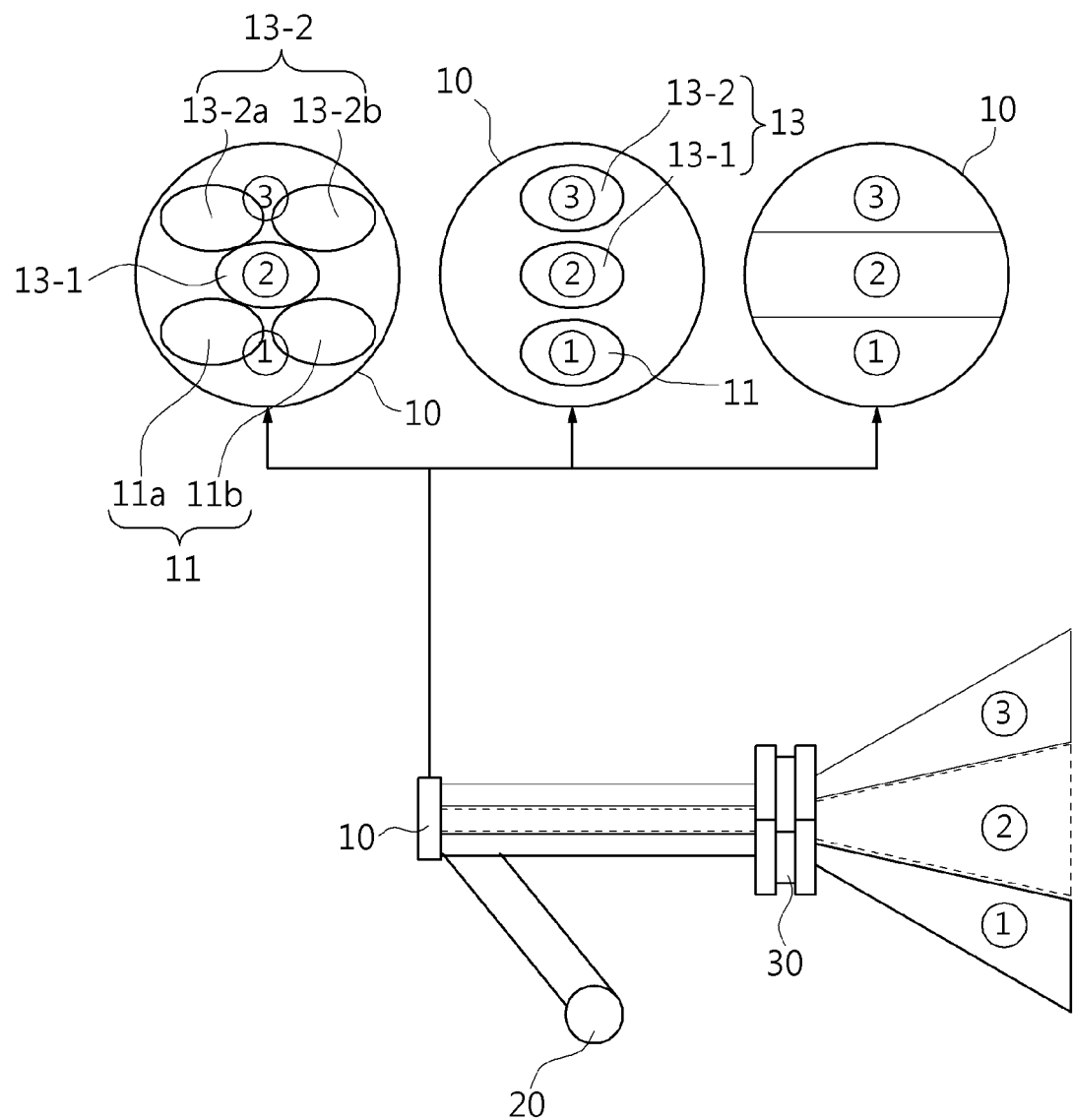
FIG. 2 is an example of various projection layouts implementing diversification of the display of the external vehicle notification information system in accordance with the present disclosure.

Meanwhile, referring to the projection layouts in FIG. 2, the projector 10 implements diversification of the display through various layouts of the rear guide information projector 11, the driving information projector 13-1, and the number information projector 13-2. Herein, ① an external vehicle notification information that is sent from the rear guide information projector 11 to be displayed on the screen 50, ② an external vehicle notification information that is sent from the driving information projector 13-1 to be displayed on the screen 50, and ③ an external vehicle notification information that is sent from the number information projector 13-2 to be displayed on the screen 50 are defined.

The projector 10 illustrated at the left side of FIG. 2 is an example of five-story layout projection using five projectors. Accordingly, in the five-story layout projection, the rear guide information projector 11 is composed of first and second projectors 11a, 11b that regard two ones as a pair, the driving information projector 13-1 is composed of one projector, and the number information projector 13-2 is composed of third and fourth projectors 13-2a, 13-2b that regard two ones as a pair.

The projector 10 illustrated in the middle of FIG. 2 is an example of three-story layout projection using three projectors. Accordingly, the three-story layout projection, the rear guide information projector 11 is composed of one projector, the driving information projector 13-1 is composed of one projector, and the number information projector 13-2 is composed of one projector.

The projector 10 illustrated at the right side of FIG. 2 is an example of single-story layout projection using one projector. Accordingly, the single-story layout projection constitutes the rear guide information projector 11, the driving information projector 13-1, and the number information projector 13-2 using one projector.

Accordingly, the five-story layout projection can diversify the display information of the rear guide information projector 11 by the first and second projectors 11a, 11b compared to one projector, and the third and fourth projectors 13-2a, 13-2b can diversify the display information of the number information projector 13-2 compared to one projector. Accordingly, the five-story layout projection has various phrases, figures, etc. displayed on the screen 50 compared to the three-story layout projection and the single-story layout projection.

Figure 3:
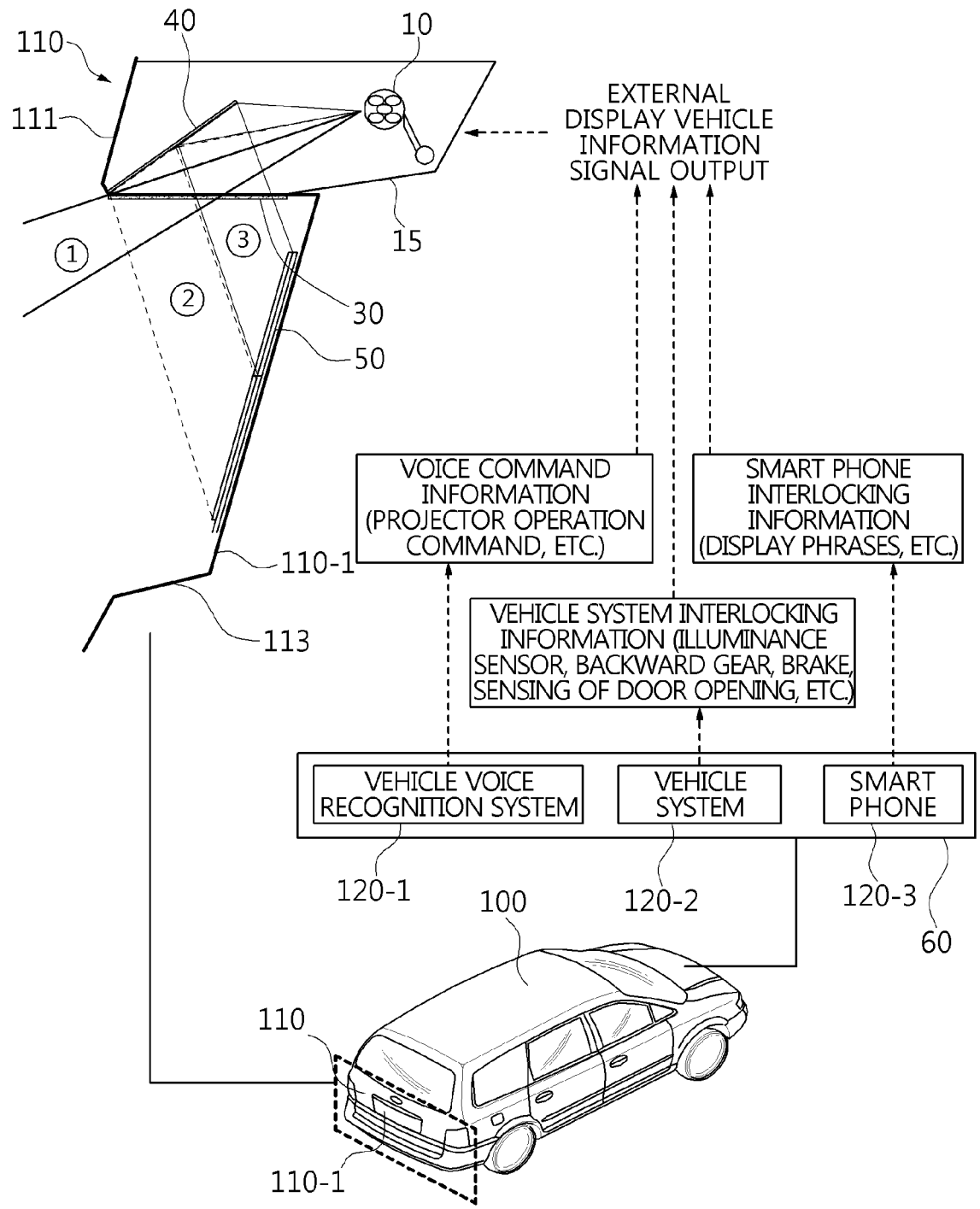
FIG. 3 is an example of a vehicle to which the external vehicle notification information system in accordance with the present disclosure is applied.
Figure 4:
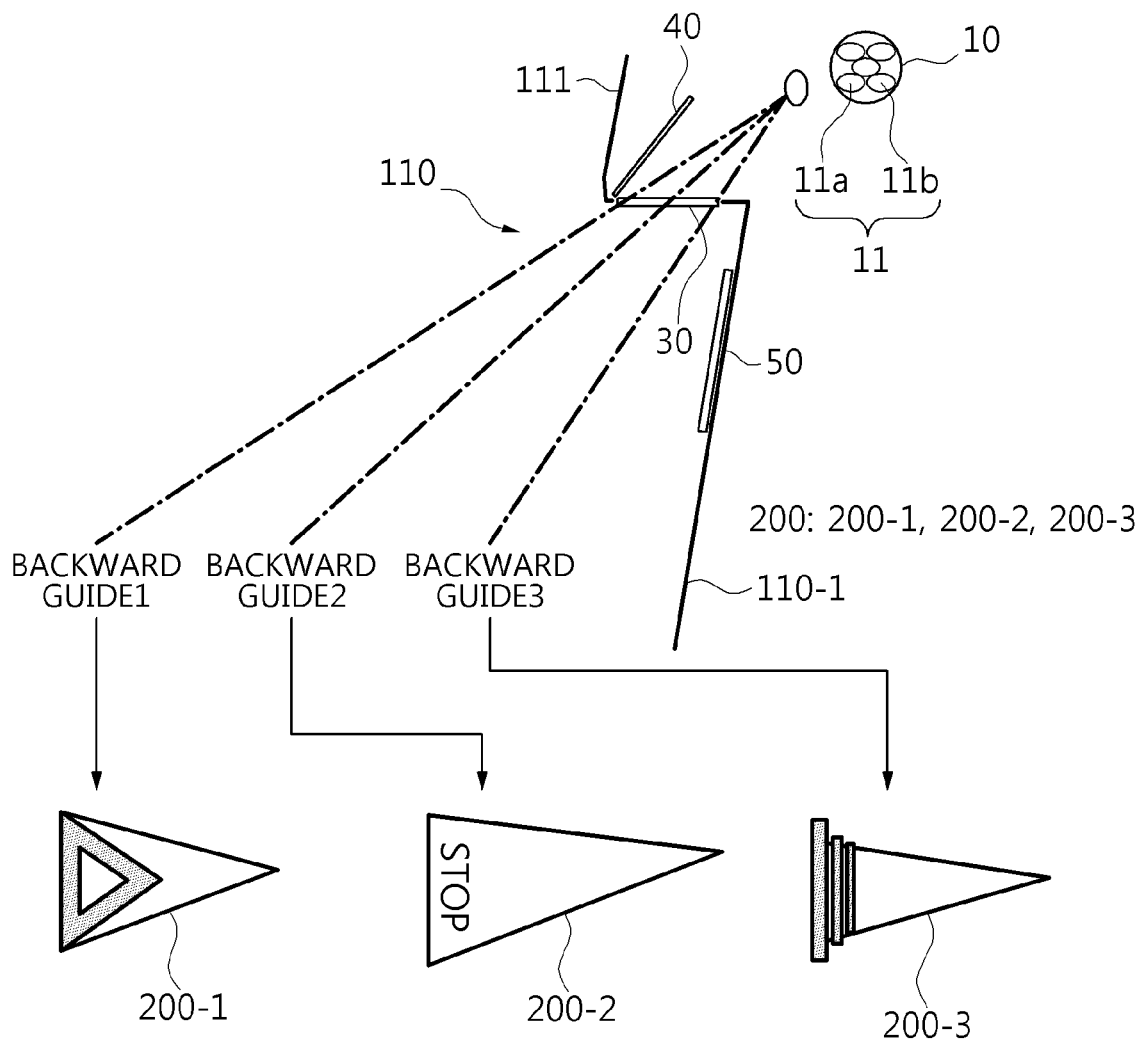
FIG. 4 is an example of a rear guide that the vehicle in accordance with the present disclosure generates on a road surface using the external vehicle notification information system.
Figure 5:
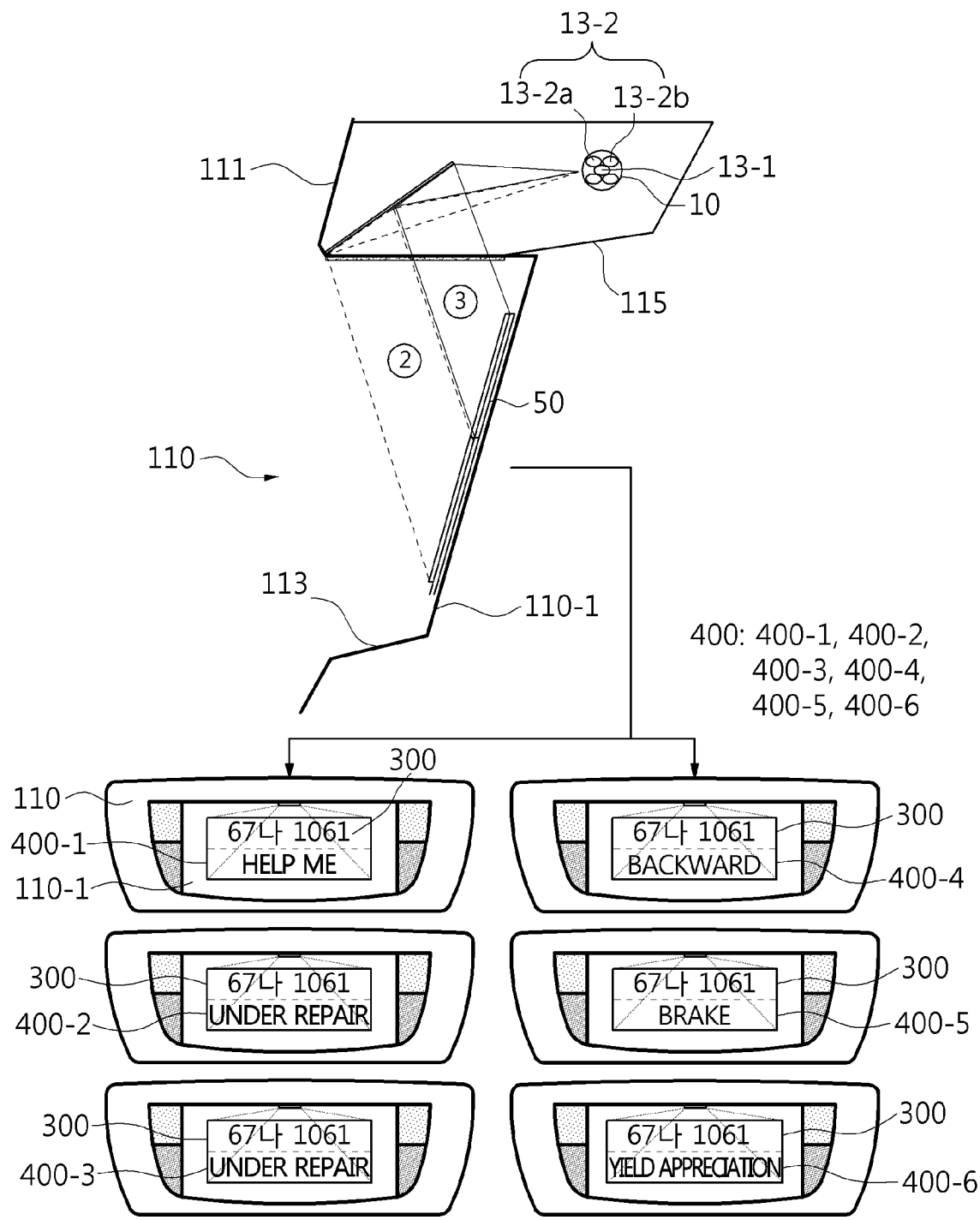
FIG. 5 is an example of vehicle information, which is divided into driving information and vehicle number, that the vehicle in accordance with the present disclosure generates on a screen using the external vehicle notification information system.

Meanwhile, FIGS. 3 to 5 illustrate the vehicle 100 applying the external vehicle notification information system 1, and the state that the external vehicle notification information is displayed through various displays of the projector 10.

Referring to FIG. 3, the vehicle 100 mounts the external vehicle notification information system 1 to a license plate mounting portion 110-1 of a trunk 110.

Specifically, a trunk upper panel 111 is divided into a trunk lower panel 113 and a trunk inner panel 115 to mount the external vehicle notification information system 1.

Specifically, the external vehicle notification information system 1 is composed of the projector 10, the light source 20, the lens 30, the reflector 40, the screen 50, and the projection controller 60 and is the same as the external vehicle notification information system 1 described through FIGS. 1 and 2. However, there is a difference in that the external vehicle notification information system 1 applies the light source 20 as a license lamp illuminating a license plate of the vehicle instead of a source of a separate light source. Further, there is a difference in that the projection controller 60 links the voice recognition module 60-1 with a vehicle voice recognition system 120-1, links the expansion module 60-3 with a vehicle system 120-2, and links the multimedia module 60-2 with a smart phone 120-3.

In terms of the mounting structure of the external vehicle notification information system 1, the projector 10, the light source 20, the lens 30, the reflector 40, and the screen 50 are arranged as follows.

As an example, the projector 10 is placed in an inner space of the trunk inner panel 115 to illuminate light toward the trunk upper panel 111, and generates light using the license lamp as the light source 20. The lens 30 is placed at a horizontal bent portion that is horizontally bent so that the trunk upper panel 111 forms the license plate mounting portion 110-1, and sends the illumination light of the projector 10 reflected from the reflector 40 toward the license plate mounting portion 110-1. Particularly, the reflector 40 is installed in order to be toward the horizontal bent portion of the trunk upper panel 111 at the inclined installation angle, and reflects the illumination light of the projector 10 toward the lens 30. Particularly, the inclined installation angle of the reflector 40 meets the angle that can always illuminate the license plate of the license plate mounting portion 110-1 in order to satisfy Vehicle License Lighting Regulations.

As an example, the screen 50 is attached to the license plate mounting portion 110-1. The projection controller 60 can be installed at any one of a trunk room of the trunk 110 or a vehicle indoor or an engine room.

In terms of the operation of the external vehicle notification information system 1, the voice recognition module 60-1, the multimedia module 60-2, and the expansion module 60-3 of the projection controller 60 are provided as follows.

As an example, the voice recognition module 60-1 is linked to the vehicle voice recognition system 120-1, and as the function of the vehicle voice recognition system 120-1, can display on the screen 50 through the projector 10 and the reflector 40 by a voice command within the vehicle.

As an example, the expansion module 60-3 is linked to the vehicle system 120-2, and as the function of the vehicle system 120-2, provides the phrases represented by various manners, such as 'Backward' display at the rear when a backward gear is operated, 'Brake' display when a brake is pressed, 'Get On/Off' display when the door is opened after the stop, as display function for the screen 50. In addition, the expansion module 60-3, as the function of the vehicle system 120-2, can function as a backward guide by interlocking with the rear guide information projector 11 of the projector 10 when a backward gear is operated on recognition at night using the illuminance sensor.

As an example, the multimedia module 60-2 is linked to the smart phone 120-3, and as the function of the smart phone 120-3, can change display phrases of the screen 50 by interlocking with the smart phone.

Referring to FIG. 4, it can be seen that the rear information is generated using the external vehicle notification information system 1 in the vehicle 100.

As illustrated, the projector 10 illuminates the generated rear information to the lens 30 using the rear guide information projector 11. Then, the rear information is not reflected from the reflector 40 and directly transmits the lens 30. As a result, the rear information is displayed on the road surface at the rear side of the vehicle.

Particularly, the rear guide information projector 11 notifies the rear vehicle of the vehicle state for each type of rear information together with diversification of the rear information by variously changing the illumination angle with respect to the rear information.

As an example, the rear information is divided into first, second, and third guide information 200-1, 200-2, 200-3. The first guide information 200-1, as the tripod display transmitted on the road, is transmitted to the rear location farthest from the vehicle in order to meet the tripod display information. The second guide information 200-2, as a STOP phrase transmitted to the road, is transmitted to the rear location at which the rear vehicle does not collide with the vehicle in order to meet the STOP information. The third guide information 200-3, as a safety distance display transmitted to the road, is transmitted to an appropriate location from the vehicle in order to meet the safety distance display information.

Referring to FIG. 5, an example in which the driving information and the number information are generated using the external vehicle notification information system 1 in the vehicle 100 can be seen.

As illustrated, the projector 10 simultaneously illustrates the driving information generated using the driving information projector 13-1 and the number information generated using the number information projector 13-2 to the reflector 40. Then, the reflector 40 forms the driving information transmitting the lens 30 below the number information by making a reflection angle of the driving information to be more downward than a reflection angle of the number information. As a result, the screen 50 displays the number information in the upper portion thereof, while it displays the driving information in the lower portion thereof.

Particularly, the number information projector 13-2 generates the vehicle registration number by the number information 300, but the driving information projector 13-1 applies various phrases by the driving information 400 to notify the rear vehicle of the vehicle state for each type of driving information together with diversification of the driving information.

As an example, the driving information 400 is divided into first, second, third, fourth, fifth, and sixth driving information 400-1, 400-2, 400-3, 400-4, 400-5, 400-6. The first driving information 400-1 indicates help request information displayed as "Help me" under the vehicle registration number, the second driving information 400-2 indicates vehicle stop information by a passenger displayed as "Get On/Off," the third driving information 400-3 indicates vehicle stop information by fault displayed as "Under repair," the fourth driving information 400-4 indicates vehicle movement information by backward displayed as "Backward," the fifth driving information 400-5 indicates vehicle braking information by brake operation displayed on "Brake," and the sixth driving information 400-6 indicates driver appreciation information displayed as "Yield appreciation."

In this case, the information and phrases of the first, second, third, fourth, fifth, and sixth driving information 400-1, 400-2, 400-3, 400-4, 400-5, 400-6 can be variously changed by linking the voice recognition module 60-1, the multimedia module 60-2, and the expansion module 60-3 of the projection controller 60 with each of the vehicle voice recognition system 120-1, the smart phone 120-3, and the vehicle system 120-2.

As described above, the external vehicle notification information system 1 applied to the vehicle 100 in accordance with the present disclosure is mounted to the trunk 110 to notify the rear vehicle at the rear portion of the vehicle 100 of the rear information 200 of backward and caution warning, the number information 300 of the vehicle registration number, and the driving information of the driver intent display, thus implementing more stable and safe driving, and particularly, to represent the external display information by projection video technology, thus maintaining driver's high visibility of the nearby vehicle regardless of day-and-night.

While the present disclosure has been described with respect to the specific embodiments, it will be apparent to those skilled in the art that various changes and modifications may be made without departing from the spirit and scope of the disclosure as defined in the following claims.

What is claimed is:

1. An external vehicle notification information system, comprising:
   a projector illuminating generated information using a light source;
   a lens transmitting the information;
   a reflector reflecting partial information of the information toward the lens; and
   a screen displaying the partial information transmitted from the lens;
   wherein the projector performs generation of the information and the illumination by a projection controller, and
   wherein the projection controller comprises a voice recognition module for voice recognition, a multimedia module for interlocking with a mobile device, and an expansion module for interlocking with a vehicle system.

2. The external vehicle notification information system of claim 1, wherein the projector divides the information into rear information, number information, and driving information.

3. The external vehicle notification information system of claim 2, wherein the number information and the driving information are reflected from the reflector as the partial information.

4. The external vehicle notification information system of claim 2, wherein the projector includes a rear guide information projector illuminating the rear information, a driving information projector illuminating the driving information, and a number information projector illuminating the number information.

5. The external vehicle notification information system of claim 4, wherein the rear guide information projector and the driving information projector are configured to include a plurality of projectors, respectively.

6. The external vehicle notification information system of claim 1, wherein the reflector is inclined with respect to the lens in order to reflect the partial information to the lens.

7. The external vehicle notification information system of claim 6, wherein the lens is in a horizontal state.

8. The external vehicle notification information system of claim 1, wherein the screen displays the partial information in the upper and lower portions thereof.

\* \* \* \* \*